T. E. ADKINS.
SPRING BOLT.
APPLICATION FILED JAN. 24, 1921.
1,424,331.
Patented Aug. 1, 1922.
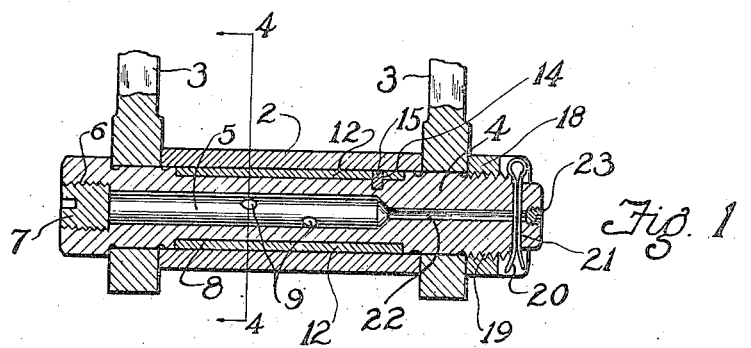
Fig. 1
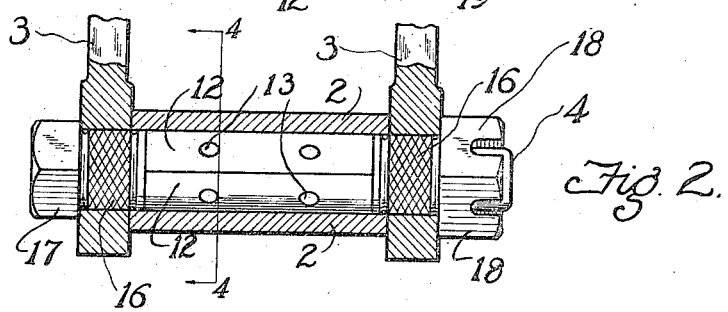
Fig. 2.
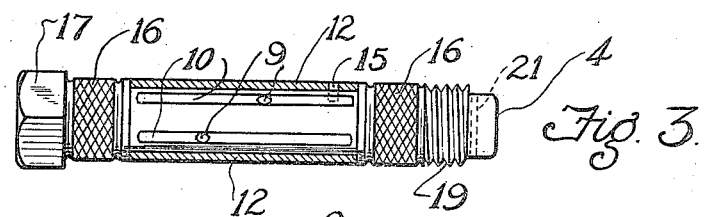
Fig. 3.
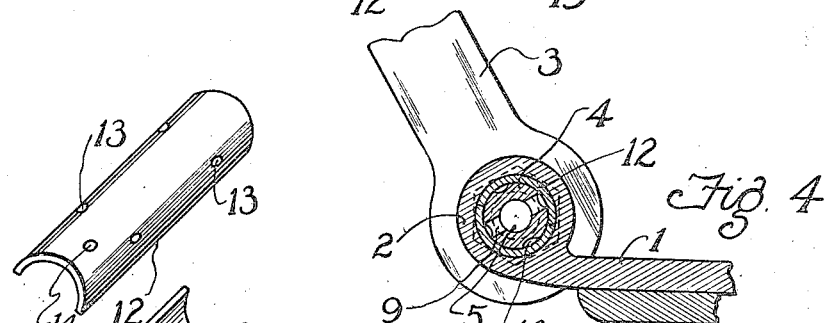
Fig. 4
Fig. 5.
Inventor
Thomas E. Adkins
By Frease, Merkel, Saywell and Bond
Attorney

UNITED STATES PATENT OFFICE.

THOMAS E. ADKINS, OF CANTON, OHIO.

SPRING BOLT.

1,424,331. Specification of Letters Patent. Patented Aug. 1, 1922.

Application filed January 24, 1921. Serial No. 439,567.

*To all whom it may concern:*

Be it known that I, THOMAS E. ADKINS, a citizen of the United States, residing at Canton, in the county of Stark and State of Ohio, have invented a new and useful Spring Bolt, of which the following is a specification.

This invention relates to spring bolts and more particularly to a bolt designed to lubricate the journals and bearings formed by bolts which are used to connect the springs to the shackles or frame of an automobile.

The object of the invention is to provide a hollow bearing bolt forming a chamber to receive the lubricant, openings being located in the bolt to permit the lubricant to pass from the chamber to the bearing surface of the bolt, a split bushing being provided around the bearing portion of the bolt to receive the eye of the spring, this bushing being perforated to allow the lubricant to pass on to the bearing surface of the spring eye.

A preferred embodiment of the invention is illustrated in the accompanying drawings, forming part hereof, in which—

Figure 1 is a longitudinal section through the eye of the spring and the shackle and the bolt therein;

Fig. 2, a similar section, the bolt being shown in elevation;

Fig. 3, a side elevation of the bolt;

Fig. 4, a cross section on the lines 4—4, Figs. 1 and 2; and

Fig. 5, a detail perspective view of the split bushing.

Similar numerals refer to corresponding parts throughout the drawing.

A portion of the usual leaf spring of an automobile is shown at 1, the eye 2 thereof being connected to the shackle 3 by the bolt embodying the present invention, which is indicated generally by the numeral 4.

The bolt is provided with a central bore 5 leading from one outer end to the intermediate portion thereof, the outer extremity of said bore being tapped as at 6 to receive a plug 7 which normally closes the grease chamber of the bolt, this plug being removable to allow a grease gun to be inserted into the threaded extremity of the bore in order to fill the grease chamber with lubricant.

The intermediate portion of the bolt is reduced in diameter as shown at 8 and radial openings 9, arranged in staggered relation lead from the central bore or grease chamber through outer surface of the bolt, each of said openings communicating with a longitudinal groove 10 formed in the reduced portion of the bolt.

For the purpose of providing a bearing surface for the eye of the spring, a bushing formed of two halves 12 is located around the reduced portion of the bolt, this bushing being provided at intervals with apertures 13 communicating with the longitudinal grooves 10, an aperture 14 being provided in one of said halves which receives a stud 15 carried by the bolt, for the purpose of retaining the bushing in proper position upon the bolt.

At each of the reduced portion of the bolt, a shouldered knurled portion 16 is provided for the reception of the shackle, this knurled surface being for the purpose of preventing the bolt from turning within the shackle bearing. The spring eye is journaled upon the bushing and between the shackles, as shown in Figs. 1 and 2, the head 17 of the bolt engaging the outer surface of the adjacent shackle, a castellated nut 18 being provided upon the screw threaded extremity 19 of the bolt and arranged to be tightened against the surface of the other shackle. A cotter pin 20 may be located through the castellated nut and a suitable opening 21 in the end portion of the bolt.

It will be evident from the above that a bolt is provided for connecting the eye of the spring to the shackle and lubricating the bearing formed by the spring eye and bolt, at the same time preventing rotation of the bolt within the bearing of the shackle.

It will also be seen that the bearing surface of the bolt may be replaced when worn by removing the halves of the bushing and replacing the same with a new bushing.

For the purpose of cleaning the grease chamber, a reduced passage 22 communicates with the inner end of the grease chamber and extends longitudinally through the adjacent end of the bolt, the screw threaded plug 23 being provided to normally close said passage.

When it is desired to clean the interior of the bolt, a grease gun filled with gasoline or the like is inserted in the end of the bolt and the gasoline is forced through the grease chamber and the radial openings 9 and through the reduced passage 22, the plug 23, being, of course, first removed.

I claim:—

1. A journal bolt having a bearing portion and shouldered portions at the extremities of the bearing portion and a removable bushing formed of longitudinal sections surrounding the bearing portion of the bolt.

2. A journal bolt having spaced shouldered portions and an intermediate bearing portion and a removable bushing formed of halves surrounding the bearing portion of the bolt.

3. A hollow journal bolt having spaced shouldered portions and an intermediate bearing portion and having apertures in its wall and a removable bushing formed of halves surrounding the bearing portion of the bolt, said bushing being provided with apertures.

4. A hollow journal bolt having apertures in its wall and longitudinal grooves communicating with said apertures and the removable bushing formed of halves surrounding the bearing portion of the bolt, said bushing being provided with apertures communicating with said longitudinal grooves.

5. A journal bolt having a reduced central portion, a removable bushing formed of halves surrounding the reduced portion of the bolt and shouldered knurled portions at the extremities of the reduced portion.

6. A journal bolt having a reduced central portion, a removable bushing formed of halves surrounding the reduced portion of the bolt, shouldered, knurled portions at the extremities of the reduced portion, a head at one extremity of the bolt and a threaded portion at the other extremity thereof.

THOMAS E. ADKINS.